US007565657B1

(12) United States Patent
Leung et al.

(10) Patent No.: US 7,565,657 B1
(45) Date of Patent: Jul. 21, 2009

(54) ALLOCATING APPLICATION TO GROUP OF CONSECUTIVE PROCESSORS IN FAULT-TOLERANT DEADLOCK-FREE ROUTING PATH DEFINED BY ROUTERS OBEYING SAME RULES FOR PATH SELECTION

(75) Inventors: Vitus J. Leung, Albuquerque, NM (US); Cynthia A. Phillips, Albuquerque, NM (US); Michael A. Bender, East Northport, NY (US); David P. Bunde, Urbana, IL (US)

(73) Assignee: Sandia Corporation, Albuquerque, NM (US)

( * ) Notice: Subject to any disclaimer, the term of this patent is extended or adjusted under 35 U.S.C. 154(b) by 326 days.

(21) Appl. No.: 11/110,206

(22) Filed: Apr. 19, 2005

(51) Int. Cl.
    *G06F 15/173* (2006.01)
(52) U.S. Cl. ...................... 718/104; 709/238
(58) Field of Classification Search ................. None
    See application file for complete search history.

(56) References Cited

U.S. PATENT DOCUMENTS 4,742,511 A * 5/1988 Johnson ....................... 370/406
5,781,546 A * 7/1998 Sethu ........................... 370/389

OTHER PUBLICATIONS

Lo, V. et al, "Non-contiguous processor allocation algorithms for mesh-connected multi-computers", IEEE Transactions on parallel and distributed systems, vol. 8, No. 7, Jul. 1997, pp. 712-726.*

Turner, S.W., Contention-free 2D mesh cluster allocations in hypercubes, IEEE Transactions on computers, vol. 44, No. 8, Aug. 1995, pp. 1051-1055.*
Vitus J. Leung, Cynthia A. Phillips, Michael A. Bender, and David P. Bunde, Algorithmic Support for Commodity-Based Parallel Computing Systems, Sandia Report, SAND2003-3702, Oct. 2003, 94 pp., Sandia National Laboratories, Albuquerque, New Mexico.
Vitus J. Leung, David P. Bunde and Jens Mache, Communication Patterns and Allocation Strategies , Sandia Report, SAND2003-4522, Jan. 2004, 22 pp., Sandia National Laboratories, Albuquerque, New Mexico.
Vitus J. Leung, Cynthia A. Phillips, Jeanette R. Johnston, Esther M. Arkin, Michael A. Bender, Joseph S. B. Mitchell, David P. Bunde, Alok Lai, and Steven S. Seiden, Processor Allocation on Cplant: Achieving General Processor Locality using One-Dimensional Allocation Strategies, Sandia Report, SAND2002-1488, Jul. 2002, 22 pp., Sandia National Laboratories, Albuquerque, New Mexico.
Christopher J. Glass and Lionel M. Ni, "The Turn Model for Adaptive Routing", Technical Report, MSU-CPS-ACS-44, Oct. 10, 1991 (revised Mar. 2, 1992), 22 pp., Michigan State University, East Lansing, MI.
William J. Dally, Charles L. Seitz, "Deadlock Free Message Routing in Multiprocessor Interconnection Networks", pp. 547-553, IEEE Transactions on Computers, vol. C-36, No. 5, May 1987.

* cited by examiner

*Primary Examiner*—Kenneth S Kim
(74) *Attorney, Agent, or Firm*—Madelynne J. Farber (57) ABSTRACT

In a multiple processor computing apparatus, directional routing restrictions and a logical channel construct permit fault tolerant, deadlock-free routing. Processor allocation can be performed by creating a linear ordering of the processors based on routing rules used for routing communications between the processors. The linear ordering can assume a loop configuration, and bin-packing is applied to this loop configuration. The interconnection of the processors can be conceptualized as a generally rectangular 3-dimensional grid, and the MC allocation algorithm is applied with respect to the 3-dimensional grid.

5 Claims, 9 Drawing Sheets

PHASE 1 OUTPUT PORTS
{+X, −X, +Y AND +Z}
{NO 180° TURNS}

PHASE 2 OUTPUT PORTS
{+Y, −Y AND +Z}
{NO 180° TURNS}

GENERAL RULE
VIRTUAL CHANNELS
CH0 → CH0
CH1 → CH1

PHASE 3 OUTPUT PORTS
{−Z}

RULE FOR ±Z
WRAPAROUND
CH0 → CH1
CH1 ⤫

ALLOCATING APPLICATION TO GROUP OF CONSECUTIVE PROCESSORS IN FAULT-TOLERANT DEADLOCK-FREE ROUTING PATH DEFINED BY ROUTERS OBEYING SAME RULES FOR PATH SELECTION

This invention was developed under Contract DE-AC04-94AL8500 between Sandia Corporation and the U.S. Department of Energy. The U.S. Government has certain rights in this invention.

This application discloses subject matter that is related to subject matter disclosed in co-pending U.S. Ser. No. 11/110,466 entitled "DISTRIBUTED COMPUTE PROCESSOR ALLOCATOR ARCHITECTURE FOR MULTIPLE PROCESSOR COMPUTING APPARATUS", and U.S. Ser. No. 11/110,344 entitled "SCALABLE MULTIPLE, PROCESSOR COMPUTING APPARATUS WHICH SUPPORTS SECURE PHYSICAL PARTITIONING AND HETEROGENEOUS PROGRAMMING ACROSS OPERATING SYSTEM PARTITIONS" (now U.S. Pat. No. 7,246,217), both filed concurrently herewith.

FIELD OF THE INVENTION

The invention relates generally to multiple processor computing and, more particularly, to communication routing and processor allocation in multiple processor computing.

BACKGROUND OF THE INVENTION

In a multiple processor computing apparatus, such as a supercomputer, the processors are typically interconnected by a network of interconnected routers, at least some of which are connected to the respective processors. Each of the routers is also connected to a plurality of other routers in the network. In such a computing apparatus, it is of course important to route communications among the processors in an efficient manner. Perhaps more importantly, however, is the need to avoid deadlock situations in the network of routers. A deadlock situation can exist, for example, when each of a plurality of routers that are interconnected with one another to form a ring or loop has a message for the next adjacent router in the loop, and all of these messages are traveling in the same direction around the loop. This type of deadlock condition, and many others, are well documented in the art.

Another important aspect of routing is fault tolerance. The system should preferably be able to avoid deadlock, even when one or more of the routers becomes inoperative (fails).

Another important aspect of operating a multiple processor computing apparatus is the allocation of processors to execute applications. For any given job, the efficiency with which that job can be performed or executed is impacted by the set of P processors allocated to perform that job. For example, if first and second different sets of P processors can be allocated to perform the job, one of the sets of P processors will typically perform the job less efficiently than would the other set of P processors.

It is desirable in view of the foregoing to provide for fault tolerant, deadlock-free routing, and efficient processor allocation in a multiple processor computing apparatus.

Exemplary embodiments of the invention utilize directional routing restrictions and a virtual (logical) channel construct to provide fault tolerant, deadlock-free routing in a multiple processor computing apparatus. Some exemplary embodiments perform processor allocation by creating a linear ordering of the processors based on routing rules used for routing communications between the processors. In some embodiments, the linear ordering of processors loops back around upon itself, and bin-packing algorithms are applied to this linear ordering to obtain a processor allocation. In some embodiments, the interconnected processors are conceptualized as a generally rectangular 3-dimensional grid, and the MC allocation algorithm is applied with respect to the 3-dimensional grid.

DETAILED DESCRIPTION

The following definitions and acronyms are used herein:

Application In the context of this document, an application runs on one or more compute processors (and also service processors in some cases) and is managed by Launcher. Users create applications and run them on a computing system. The user's purpose for using the computing system is to run applications.

Batch Job A type of job that runs unattended. Users submit batch jobs to a batch system in the form of a job script. The batch system determines when and where (i.e., on which service processor) the job script should be run.

Compute Processor The computing system is typically made up of many thousand compute processors. Applications run on a partition of compute processors that was allocated by the CPA.

Interactive Job A type of job that requires user interaction. Interactive jobs are submitted to the batch system in a similar way to batch jobs, but without a job script. When the batch system launches an interactive job, it opens up a shell on a login processor for the user to interact with. Interactive jobs are useful for tasks such as debugging.

Job A job is a task or set of tasks being performed by or on behalf of a user (e.g. invoke Launcher to launch an application). Jobs are submitted by users to the batch system in the form of a job script. The batch system determines when a job should run based on a scheduling policy and the available resources. The batch system terminates a job when it exceeds its time limit. A job is considered finished when its job script exits.

Job Script A UNIX shell script defining the commands to run for a batch job. Typically, a job script will contain one or more Launcher invocations.

Login Processor The computing system is typically made up of many login processors. Users are placed onto login processors by a load balancing mechanism. Launcher can only be run from login processors.

Partition A partition defines a physical set of compute processors. The batch system allocates a partition for each job it launches. A job can only access the compute processors in its partition. Purely inactive launchers (those not part of a batch job) also run inside of a partition. When an interactive launcher wishes to run its application, it must first create a partition.

PCT One process control thread (PCT) daemon runs on each compute processor. Launcher communicates with PCTs in order to launch and manage its application. The CPA communicates with PCTs in certain error cases.

Showmesh The Showmesh program used by users to display the state of all compute processors in the system.

Launcher Launcher is the program that launches and manages an application running on compute processors. Launcher must request and be granted a set of compute processors from a compute processor allocator before it can run its application.

Figure 1:
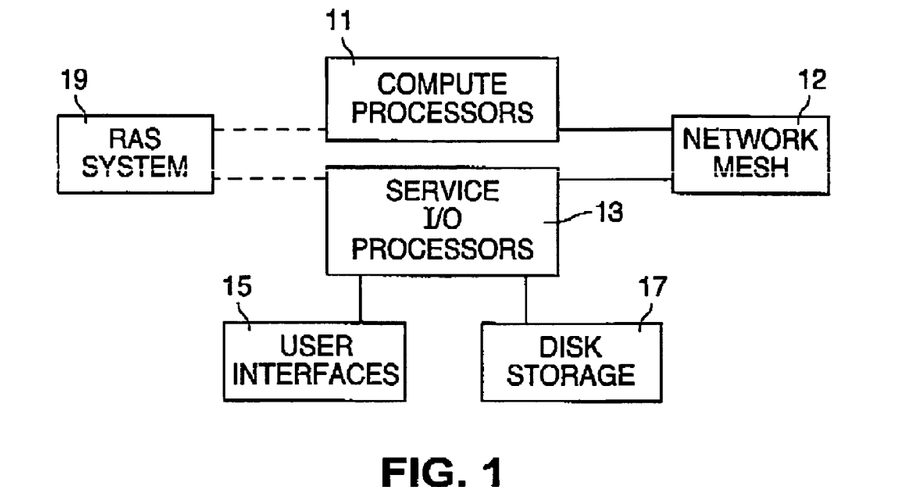
FIG. 1 diagrammatically illustrates a computing apparatus according to exemplary embodiments of the invention.

FIG. 1 diagrammatically illustrates a multiple processor computing apparatus according to exemplary embodiments of the invention. The computing apparatus includes a plurality of compute processors designated generally at 11 and a plurality of service I/O processors designated generally at 13. The processors at 13 are also referred to herein simply as service processors. The service processors at 13 provide for interfacing to users and disk data storage, as indicated generally at 15 and 17, and can also support other services and external interfaces. A network mesh 12 interconnects the compute processors 11 among one another, interconnects the service processors 13 among one another, and interconnects the compute processors 11 with the service processors 13. The compute processors 11 primarily run computationally intensive applications. Also illustrated in FIG. 1 is a reliability, availability and serviceability (RAS) system 19 as shown by broken line. The RAS system 19 is cooperable with the compute processors 11 and the service processors 13 to support reliability, accessibility and serviceability of the computing apparatus.

Figure 2:
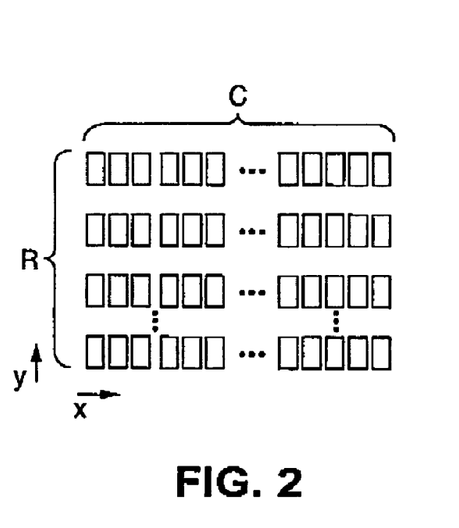
FIG. 2 illustrates a cabinet arrangement for a computing apparatus according to exemplary embodiments of the invention.

FIG. 2 illustrates an arrangement of cabinets for housing the compute processors 11 and service processors 13 of FIG. 1 according to exemplary embodiments of the invention. As shown in FIG. 2, the cabinets are arranged in a generally rectangular array having R rows and C columns for a total of RC cabinets. Each of the cabinets houses a plurality of the processors illustrated generally at 11 and 13 in FIG. 1. This is illustrated in more detail in FIG. 3.

Figure 3:
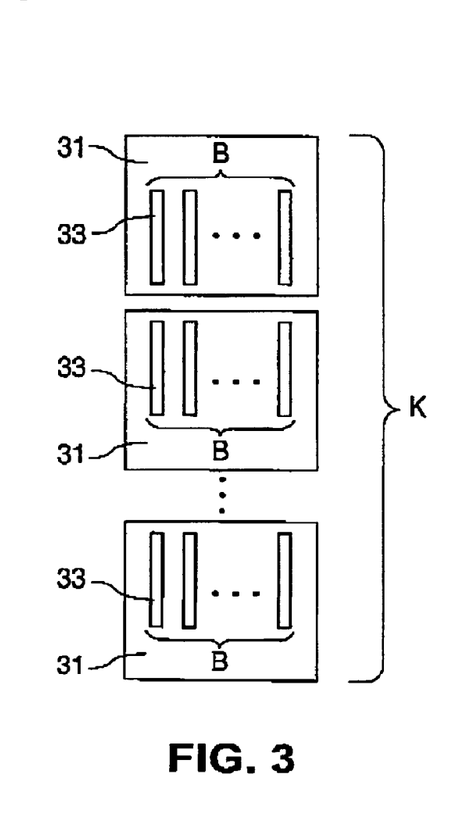
FIG. 3 diagrammatically illustrates a circuit board and card cage arrangement within a cabinet of FIG. 2 according to exemplary embodiments of the invention.

FIG. 3 diagrammatically illustrates the interior layout of each of the cabinets of FIG. 2 according to exemplary embodiments of the invention. As shown in FIG. 3, each of the cabinets of FIG. 2 has mounted therein K card cages 31, each of which in turn houses B printed circuit cards or boards 33. The compute processors 11 and service processors 13 are mounted on the circuit boards 33. In some embodiments, each cabinet is either a compute processor cabinet or a service processor cabinet, wherein compute processor cabinets include only compute processors 11 and service processor cabinets include only service processors 13.

Figure 4:
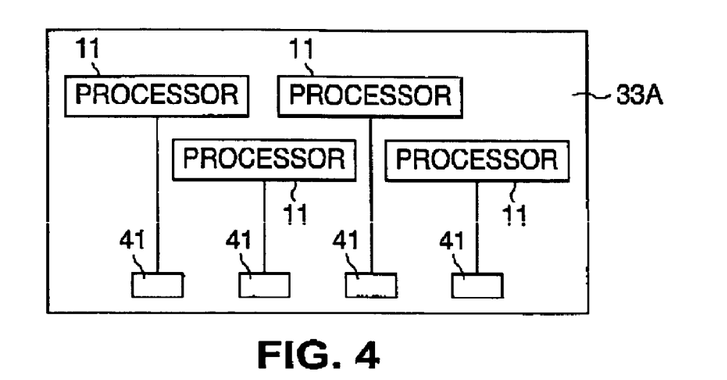
FIG. 4 diagrammatically illustrates a compute processor board according to exemplary embodiments of the invention.

FIG. 4 diagrammatically illustrates a compute processor board according to exemplary embodiments of the invention. The compute processor board 33A of FIG. 4 represents an example of a circuit board 33 of FIG. 3 having only compute processors 11 mounted thereon. Each of the four compute processors 11 is connected to a respectively corresponding router integrated circuit chip 41. In some embodiments, the compute processors 11 are commercially available AMD Opteron (Sledgehammer) data processing integrated circuits. In various embodiments, the routers 41 are implemented by commercially available network interface chips or custom ASIC chips. The routers 41 form part of the network mesh 12 of FIG. 1 as will be described hereinbelow in further detail.

Figure 5:
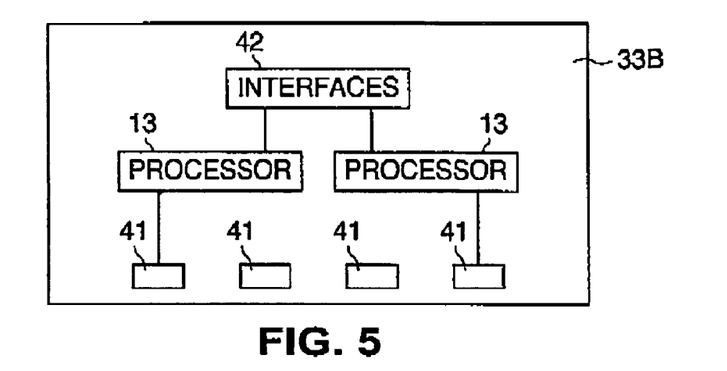
FIG. 5 diagrammatically illustrates a service processor board according to exemplary embodiments of the invention.

FIG. 5 diagrammatically illustrates a service processor board according to exemplary embodiments of the invention. The service processor board 33B of FIG. 5 includes four routers 41 as described above with respect to FIG. 4, two of which are connected to respectively corresponding service processors 13. The service processor board 33B also includes interfaces connected to the two service processors 13. These interfaces are designated generally at 42. In some embodiments, the interfaces at 42 can include Ethernet interfaces, Fiber Channel (FC) interfaces, graphics cards, etc. All of the routers 41 in FIG. 5, including those not connected to the service processors 13, form part of the network mesh 12 of FIG. 1. In some embodiments, the service processors 13 are AMD Opteron (Sledgehammer) data processing integrated circuits.

For clarity of exposition, some components (such as local memory devices) not necessary for understanding the present invention have been omitted in FIGS. 4 and 5.

Referring to FIGS. 2-5, some exemplary embodiments include R=4 rows of cabinets, C=31 columns of cabinets, K=3 card cages per cabinet, and B=8 circuit boards per card cage. In such embodiments, a compute processor cabinet which houses only compute processors would house 4×24=96 compute processors, and a service processor cabinet which houses only service processors would house 2×24=48 service processors. In some embodiments, 27 of the 31 columns are populated with compute processor cabinets, and the remaining 4 columns (2 columns on each end of the array) include only service processor cabinets. Such embodiments thus include 4×27×96=10,368 compute processors and 4×4×48=768 service processors. The network mesh 12 of FIG. 1, in conjunction with the generally rectangular cabinet array of FIG. 2, permits the computing apparatus to be physically scaled upwardly to include more processors as desired.

Figure 6:
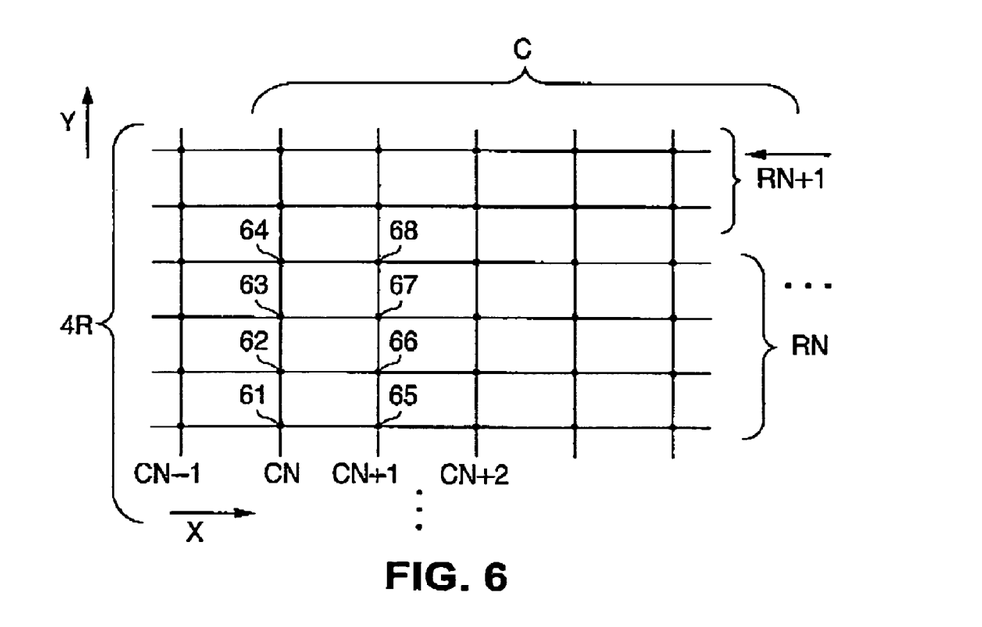
FIG. 6 is a two-dimensional logical view of the network mesh of FIG. 1.

FIG. 6 diagrammatically illustrates a portion of the network mesh 12 of FIG. 1 according to exemplary embodiments of the invention. As will become apparent hereinbelow, the network mesh 12 is logically conceptualized as a three-dimensional network which interconnects the routers 41 of the compute processor boards and service processor boards of FIGS. 4 and 5. FIG. 6 illustrates a portion of a single xy plane in the logical three-dimensional network mesh. Each two-dimensional xy plane of the network mesh represents the interconnections of respective circuit boards located at one of the KB locations in the cabinet arrangement of FIG. 3. Any given board mounted at any given board position in any one of the cabinets in the rectangular array is interconnected to the correspondingly positioned board in each adjacent processor cabinet of the array. The routers 41 of the first board at the left in the upper card cage 31 of FIG. 3 are interconnected with the respectively corresponding routers of the corresponding boards at that same board position in each adjacent processor cabinet of the array. Moreover, for any given board, all four routers thereof are connected in series with one another. Accordingly, the network nodes at 61, 62, 63 and 64 of FIG. 6 correspond to routers of a single circuit board, either a service board or a compute board. Note that these four routers are connected in series with one another, and are also connected to the respectively corresponding four routers of the positionally corresponding board in the next adjacent cabinets in the row (in the +x and −x directions). So, for example, routers 61-64 are respectively connected in the +x direction to routers 65-68. Also, each set of series connected routers 61,62, 63, 64 and 65,66,67, 68 of a given board is connected in series with a set of series connected routers of the positionally corresponding board in the next adjacent cabinets in the column (in the +y and −y directions).

For the cabinet array of FIG. 2, with R rows and C columns, each xy plane (or planar grid) of the logical network mesh corresponds to the interconnections of the routers of all boards in the same corresponding board positions in the cabinets. So the xy plane will include 4RC of the routers 41 of FIGS. 4 and 5. The routers on each board are connected in series with one another, each router is connected to its corresponding router on the correspondingly positioned board in the next row-adjacent cabinet, and each set of series connected routers of a given board is connected in series with the set of series connected routers of the correspondingly positioned board of each column-adjacent cabinet. This results in 4R series connected routers per column of FIG. 2 (y direction of FIG. 6), and 4 sets of C interconnected routers per row of FIG. 2 (x direction of FIG. 6). Adjacent columns in FIG. 6 are indicated at CN−1, CN, CN+1, and CN+2, and adjacent rows in FIG. 6 are indicated at RN and RN+1.

Figure 7:
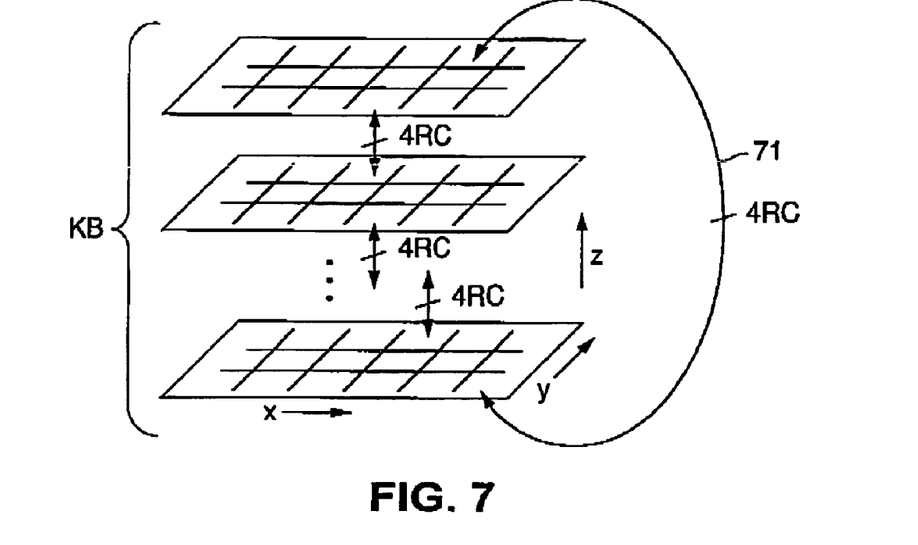
FIG. 7 is a three-dimensional logical view of the network mesh of FIG. 1.

FIG. 7 illustrates the third logical dimension of the network mesh 12. There are KB logical network grid planes (xy planes), one for each of the KB circuit board positions illustrated in FIG. 3. Each of the KB planar grids is constructed identically to the exemplary planar grid described above with respect to FIG. 6. The KB planar grids are interconnected with one another to form the third dimension of the three-dimensional logical network mesh. This interconnection in the third logical dimension (z dimension) represents the interconnection within each cabinet (see also FIG. 2) of each router to its corresponding router on each of the other KB-1 boards in that cabinet. In the z direction, the corresponding routers are interconnected to form a torus, as illustrated by the wrap-around connection at 71 in FIG. 7.

More particularly, and referring to FIG. 4 as an example, the left-most router 41 of FIG. 4 would be connected in a torus with each of the other KB-1 left-most routers on the other KB-1 circuit boards within its cabinet. So each router of each board is interconnected with every other positionally corresponding router of every other board in the cabinet to form a torus. As mentioned above with respect to FIG. 6, each planar grid of the mesh includes 4RC routers, so there are 4RC interconnections in the z direction between each plane of the three-dimensional network mesh, as illustrated in FIG. 7.

Figure 8:
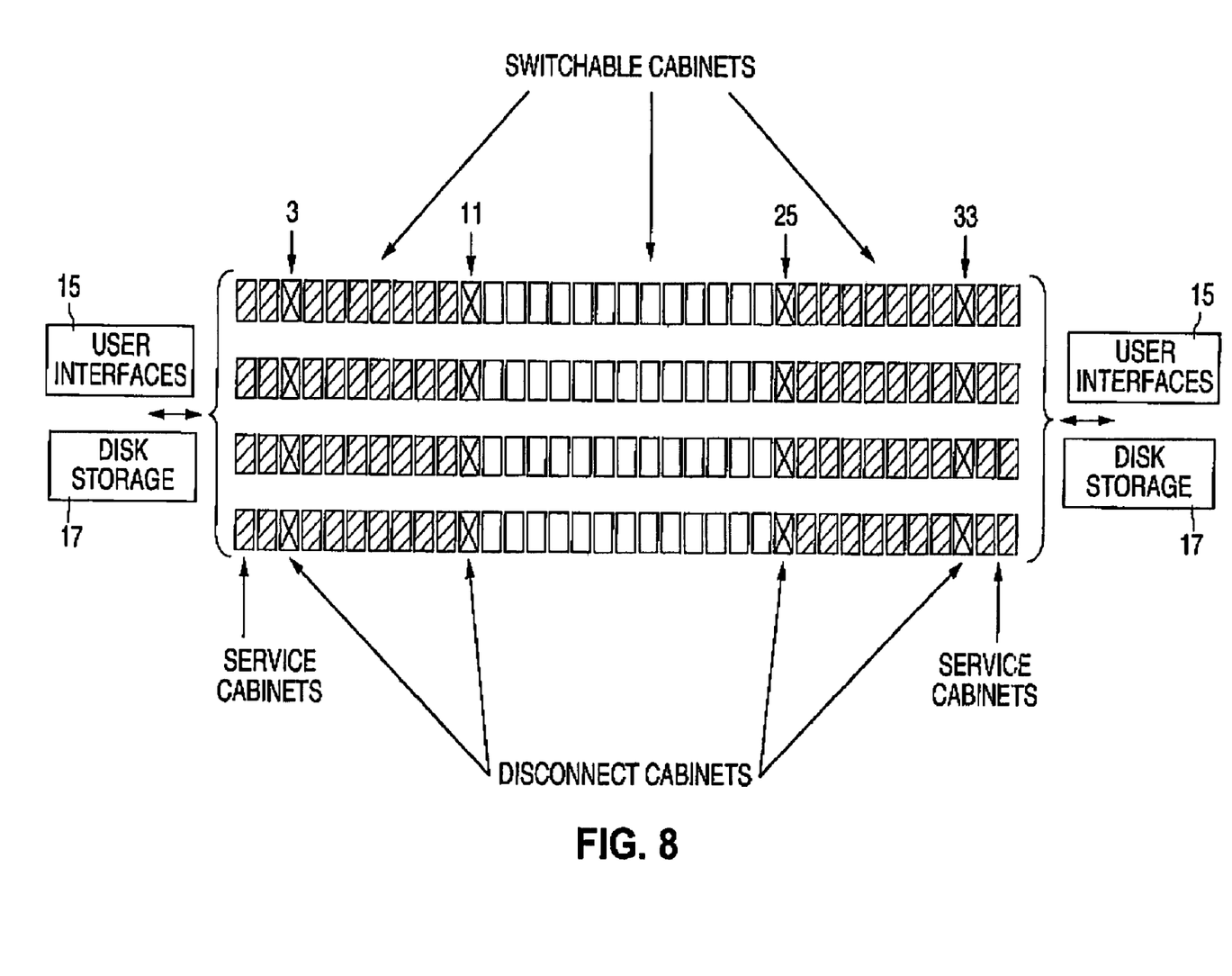
FIG. 8 illustrates a cabinet arrangement similar to that of FIG. 2, including classified/unclassified partitioning according to exemplary embodiments of the invention.

FIG. 8 is similar to FIG. 2, and illustrates an exemplary classified/unclassified partitioning arrangement which permits secure access to classified applications, while still permitting unclassified users to access the computing apparatus. The rectangular cabinet array of FIG. 8 includes 4 rows and 35 columns. Two pairs of columns at each end are service processor cabinets (service cabinets) which house only service boards, 4 columns of disconnect cabinets are distributed between the outer columns of service cabinets, and the remaining cabinets between the outer two pairs of service cabinet columns are compute processor cabinets (compute cabinets) which house only compute boards. Each row thus includes 27 compute cabinets, 4 service cabinets and 4 disconnect cabinets. The FIG. 8 arrangement is distinguished from the prior art, wherein service processors are dispersed among compute processors in cabinets at both ends of the cabinet array Each of the disconnect cabinets includes a switching structure which is designated generally by an X in the cabinet. These switching structures permit the x direction connections in the three-dimensional network grid to be selectively closed and opened in order to provide flexibility for classified/unclassified partitioning. In the example of FIG. 8, all compute cabinets between the end pairs of service cabinet columns are selectively switchable into communication with one another and with either of the end pairs of service cabinet columns. The service cabinets provide access to the user interfaces and disk storage 15 and 17 (see also FIG. 1).

When all of the switch structures are closed to make all x-direction connections between all cabinets, then all compute cabinets and all service cabinets are available to all users. When the switch structures in the cabinets of Column 33 are opened and all other switches are closed, users at 15 on the right-hand side of FIG. 8 can still utilize the right-hand pair of service cabinet columns to access disk storage 17 at the right-hand side. In this configuration, all of the compute cabinets and the left-hand pair of service cabinet columns are available for classified operations for users at the left-hand side, and are also isolated from unclassified users at the right-hand side. If this configuration is modified by closing the switches at Column 33 and opening those at Column 25, then users at the right-hand side would have access to the compute cabinets between Columns 25 and 33, but still would not have access to the remainder of the compute cabinets, and vice versa for the users on left-hand side of the arrangement. Thus, various combinations of opening and closing the switches in Columns 3, 11, 25 and 33 can provide various numbers of compute cabinets for either classified or unclassified operations, but in any event unclassified users can still access service cabinets and disk storage. In other switch configurations, the unclassified users can access some, or even most of the compute cabinets, depending on the amount of compute cabinets needed for the desired classified operations.

Referring again to FIGS. 3-6 and the corresponding description, there are 4 KB connections between row-adjacent processor cabinets, so the switching structures must each be capable of switching 4 KB communication paths. In the aforementioned example where K=3 and B=8, each of the 16 switch structures illustrated in FIG. 8 must be capable of switchably making and breaking 4×3×8=96 x-direction connections between cabinets.

Figure 9:
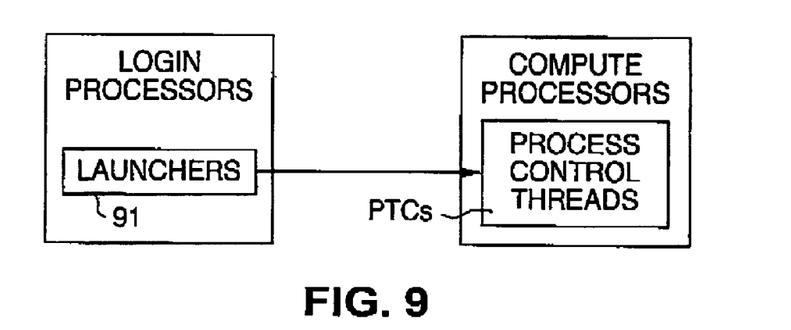
FIG. 9 diagrammatically illustrates the launching of applications on compute processors according to exemplary embodiments of the invention.

FIG. 9 diagrammatically illustrates an example of how applications can be launched on compute processors in the computing apparatus of FIGS. 1-8. In the example of FIG. 9, a subset of the service processors known as login processors support launching programs, designated generally as launchers 91 in FIG. 9. The launching programs communicate with process control threads (PCTs) in the various compute processors in order to effectuate launching of the desired applications. In some embodiments, the launchers 91 can utilize conventional techniques to launch applications on the compute processors. For example, a launcher 91 can read the binary image of the executable into memory, and then, via the network mesh, fan that binary image out logarithmically across the compute processors which have been allocated to run the application. In general, such cooperation between launching programs and process control threads in compute processors is conventional.

Figure 10:
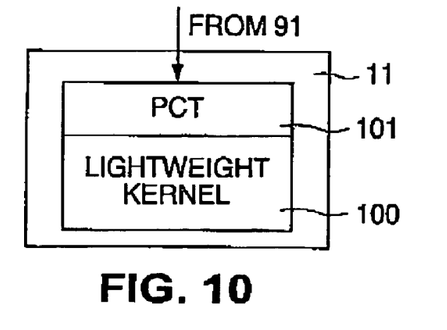
FIG. 10 diagrammatically illustrates an operating system of compute processors according to exemplary embodiments of the invention.

FIG. 10 diagrammatically illustrates an operating system of the compute processors 11 according to exemplary embodiments of the invention. In the example of FIG. 10, the compute processor operating system includes a lightweight kernel which is custom tailored to support the types of application codes that the compute processors are intended to execute. In general, the use of a lightweight kernel operating system on a processor that executes computationally intensive applications is conventional. FIG. 10 also illustrates a PCT (process control thread) layer on top of the lightweight kernel. This is the layer that the launchers 91 of FIG. 9 communicate with to effectuate launching and management of applications. The PCT layer in turn interfaces with the lightweight kernel to support launching and managing the application.

Figure 11:
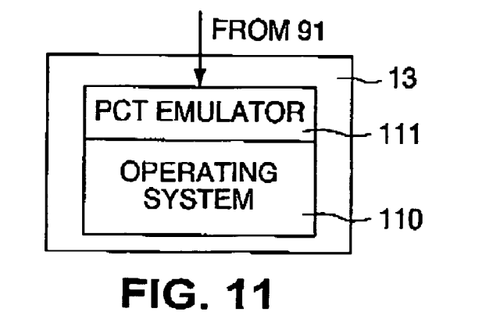
FIG. 11 diagrammatically illustrates an operating system of service processors according to exemplary embodiments of the invention.

FIG. 11 diagrammatically illustrates an operating system used by at least some of the service processors 13 according to exemplary embodiments of the invention. The service processors 13 include a generally full-featured operating system 110, for example UNIX, a UNIX derivative, or Linux. Such a full-featured operating system is provided in order to permit the service processors 13 to provide the various service and I/O functions described above. A PCT emulator layer 111 is provided on top of the full-featured operating system 110. This PCT emulator 111 interfaces between the launchers 91 of FIG. 9 and the operating system 110. In this regard, the PCT emulator 111 presents to the launchers the same interface presented by the PCT layer 101 of FIG. 10. This permits the launchers 91 to launch and manage applications within a single batch job on both service processors 13 and compute processors 11. The PCT emulator 111 looks like the PCT layer 101 to the launchers 91, and the PCT emulator translates between the communication format of the launchers 91 and the communication format expected by the operating system 110. From the perspective of the launchers 91, communication with the service processors 13 appears identical to communication with the compute processors 11.

The aforementioned capability of launching and managing applications from a single job on both compute processors 11 and service processors 13 permits the service processors 13 to render support processing (e.g., graphics processing) relative to the computational information produced by the compute processors 11 involved in the job. Without the PCT emulator layer 111, the launchers within a single job can launch and manage applications on either the compute processors 11 or the service processors 13, but not on both compute and service processors during the same job. Therefore, without the PCT emulator 111, any computations produced by the compute processors 11 would need to be stored on disk storage 17 (see also FIGS. 1 and 8), and the aforementioned support processing performed by the service processors 13 would have to be performed on the stored computations during another job.

Figure 12:
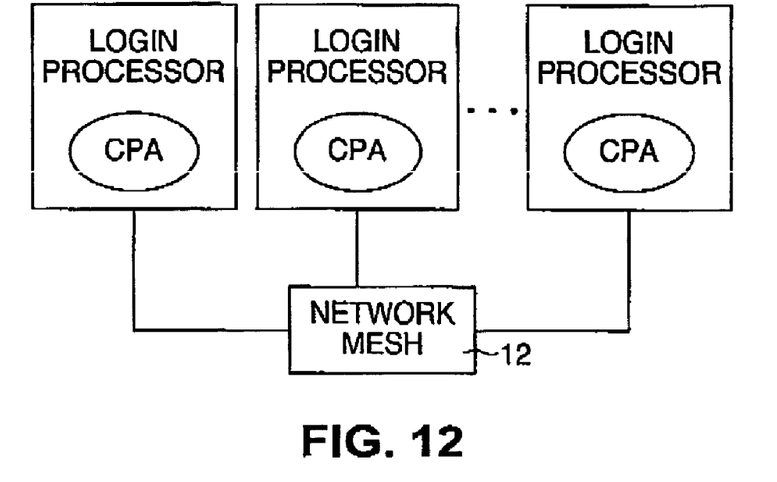
FIG. 12 diagrammatically illustrates a compute processor allocator architecture according to exemplary embodiments of the invention.

FIG. 12 diagrammatically illustrates a compute processor allocator architecture according to exemplary embodiments of the invention. As shown in FIG. 12, each of the aforementioned login processors (see also FIG. 9) includes a compute processor allocator (CPA) whose purpose is to allocate compute processors 11 to users of the computing apparatus. Typically, the computing apparatus will have many simultaneous users (for example 60) and will contain thousands of compute processors (for example over 10,000).

Figure 13:
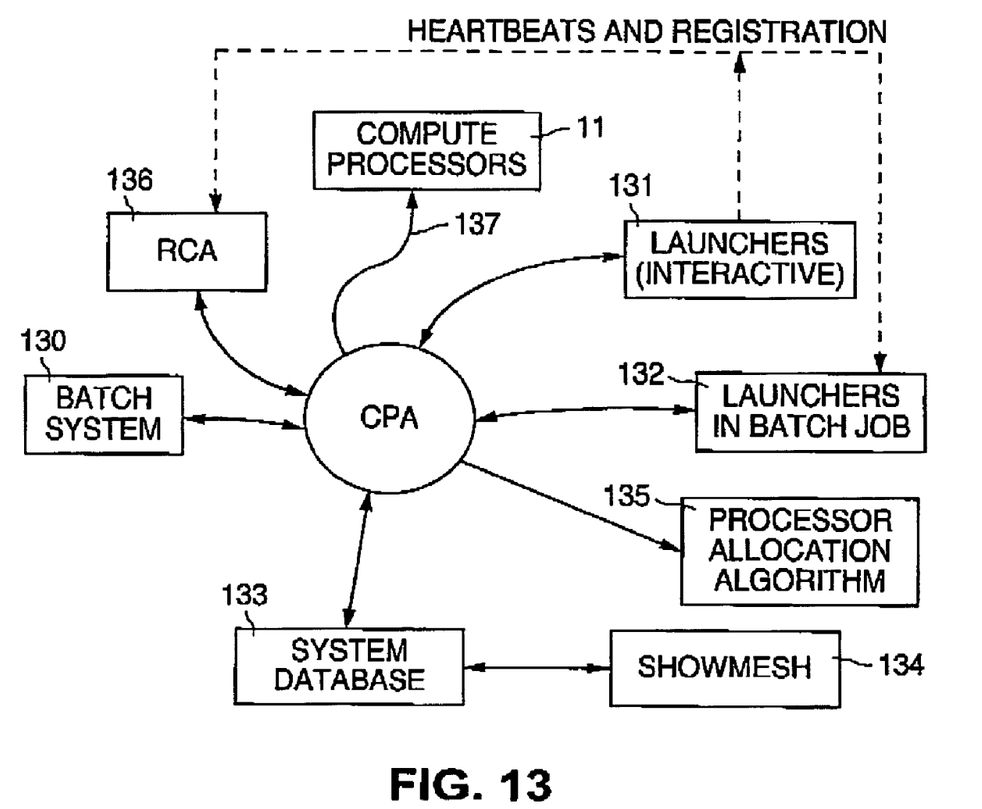
FIG. 13 diagrammatically illustrates operations and interactions of a compute processor allocator according to exemplary embodiments of the invention.

The CPAs can be implemented as daemons (e.g. UNIX programs written in C) running on the respective login processors. FIG. 13 diagrammatically illustrates various entities which interface with any given CPA daemon. The CPA daemon can communicate with each of the illustrated entities via suitable application programming interfaces and associated library functions. The use of application programming interfaces for communication among software models is well known in the art. In some embodiments, the batch system 130 (running on a service processor 13) and the launchers are the only clients of the CPA. The launcher clients are illustrated generally at 131 and 132 in FIG. 13. As illustrated, some launchers are part of jobs that have been dispatched by the batch system 130, and other launchers are interactive launchers which launch applications for activities such as interactive development and debugging operations.

In some embodiments, the CPA daemons run continuously on the respective login processors. The CPA daemon accepts requests from its clients, launchers and the batch system. The CPA daemon waits for client requests in its main dispatch loop. Upon receiving a client request, the CPA processes the request and returns the result to the client. It then returns to waiting. Client requests are processed in FIFO order. The CPA daemon can also respond to event indicators received from the RCA (Resiliency Communication Agent) 136. As described in more detail below, upon receiving an RCA event, the CPA determines if it must take action, and if so, performs the required action. It can then return to waiting in its main dispatch loop. RCA events are processed in FIFO order.

The batch system 130 can cooperate with a CPA to create and assign a compute processor partition for each job before it is started. In this sense, a compute processor partition is simply a number of processors required by the batch job (or interactive application). Each launcher that is part of a batch job must allocate compute processors from the partition in which the job is running. An interactive launcher can cooperate with a CPA to create and assign to itself its own compute processor partition, and can then allocate processors from the partition for the application to be launched by the interactive launcher.

In some embodiments, the compute processors are divided into a batch pool and an interactive pool, the batch pool available for batch jobs, and the interactive pool available for the applications launched by interactive launchers. Only the batch system 130 may create a partition in the batch pool. When the batch system 130, or an interactive launcher at 131, requests the CPA to create a partition, the CPA retrieves from the system database 133 a list of available compute processors. This aspect of the invention is useful because state information for the entire computing apparatus can be stored in the system database 133. This means that all of the CPA daemons can be stateless. This decreases the processing burden placed on the login processors to run the CPA daemons, and also makes the CPA daemons more modular in nature and more easily selectable to replace one another in the even of CPA failures. The system database 133, in some embodiments, is implemented by one or more service processors 13 running the commercially available MySQL server, and accessing disk storage 17 (see also FIG. 1).

Once the CPA receives the list of available processors from the system database 133, the CPA calls a physical processor allocation algorithm 135 (which can be included as part of the CPA daemon in some embodiments) and provides that algorithm with the list of available processors, the partition size requested by the client, and a processor ID list to use when allocating the compute processors. The processor ID list is optionally provided by the batch system or interactive launcher program to specifically identify the compute processors desired for its applications.

In some embodiments, the physical processor allocation algorithm 135 can allocate compute processors according to any suitable conventionally available algorithm. Once the compute processor allocation has been completed at 135, the CPA communicates with the system database 133 to update the overall system state such that it reflects the new compute processor allocation, and provides the new compute processor allocation information to the requesting client.

When a batch job exits, the batch system 130 requests destruction of the partition that the job was running in. An interactive launcher requests destruction of its partition when it exits. Whenever the CPA destroys a partition, it updates the system database appropriately to reflect this destruction.

As indicated above, the system database 133 stores persistent state information such as what compute processors are available for allocation, how many compute processors are available for allocation, how many compute processors a job is allowed to use, and what launchers are running and which compute processors have been assigned to them. If any part of the CPA architecture crashes, the system database information is used to restore state when the CPA architecture is restarted. This use of database backend has several benefits. First, it provides robust mechanisms for storing state. When system state is to be changed, a conventional atomic database transaction can be used to insure that the state is either completely updated or not at all. This improves upon prior art systems that store persistent state information in a flat file. It is difficult to ensure that a flat file is written consistently when the CPA crashes.

Another advantage is that the database backend provides a straightforward mechanism for storing and efficiently querying structured information, for example using standard SQL statements. Designing database tables is less error prone and more flexible than designing custom data structures for the CPA. Finally, the use of a database enables the compute processor allocator architecture to be distributed. Conventional network databases are designed to multiplex many simultaneous clients (e.g., CPAs). Locking mechanisms and transaction semantics are provided to prevent clients from conflicting with one another and corrupting data.

Furthermore with respect to the system database 133, a program designated as Showmesh 134 in FIG. 13 provides users with the capability of accessing the state information stored in the system database 133. In some embodiments, the Showmesh program illustrated in FIG. 13 runs on a service processor 13, and uses the conventional SQL2C library to query the system database 133. By interacting directly with the system database on behalf of interested users, the Showmesh program provides a communication path to the system database that is independent of the CPA daemons. The design of the CPA daemons can thus be simpler than in prior art systems wherein the CPA daemons support user access to the database.

Some embodiments do not require that a CPA daemon run on each login processor. In such embodiments, the CPA daemon is designed such that it can process requests from launchers running on other login processors which do not have CPA daemons. However, by maximally distributing CPA daemons among the login processors, the burden of management duties on any single CPA daemon will be reduced. The distributed design of the CPA structure is more scalable than prior art single daemon approaches. At the same time, distributing the CPA daemons only among the login processors provides advantages in terms of processing power when compared to prior art systems that provide CPA daemons on every compute processor.

In some embodiments, the persistent state information maintained in the system database 133 of FIG. 13 includes some or all of the information described below.

| Processor ID | Alloc Mode | Partition ID | Launcher ID |
|---|---|---|---|
| Integer | batch/ interactive/ reserved | 64-bit/ NONE | 64-bit/ NONE |

The Compute Processor Allocation Table contains one row (example row shown above) for every compute processor in a compute system that is available for allocation. The 'Alloc Mode' field specifies how the processor can be allocated. If the 'Alloc Mode' is set to batch, the processor may be allocated to batch jobs. If 'Alloc Mode' is set to interactive, the processor may be allocated to batch jobs and interactive Launchers. If 'Alloc Mode' is set to reserved, the processor may not be assigned in the future. The 'Partition ID' field specifies the partition ID that a process is part of, or is NONE if the processor isn't part of a partition. The 'Launcher ID' field specifies the Launcher ID that the processor has been assigned to, or NONE if the processor isn't assigned to a Launcher.

| Partition ID | Administration Cookie | Allocation Cookie | User ID | Batch Job ID |
|---|---|---|---|---|
| unsigned 64-bit | 64-bits | 64-bit | String | integer/NONE |

| Partition Creation Time | Max In Use | Batch Job Error |
|---|---|---|
| Date and time | Integer | boolean |

The Partition Table contains one entry (example entry shown above) for each compute processor partition in the system. The compute processors making up a partition can be obtained by inspecting the Compute Processor Allocation Table. The 'Partition ID' filed stores the ID that the CPA assigned to the partition. This ID is guaranteed to be unique within a single boot-shutdown cycle of the computing apparatus. The 'Administration Cookie' field stores a pseudo-random number that a client must match in order to destroy the partition. The 'Allocation Cookie' field stores a pseudorandom number that a client must match in order to allocate processors from a partition. Both cookie fields can only be read and set by the CPA daemon. The 'User ID' specifies the UNIX user name of the partition's owner. The 'Batch Job ID' field specifies the batch job ID that the partition has been assigned to, or NONE if the partition is in use by an Interactive Launcher. The 'Partition Creation Time' field stores the date and time when the partition was created. The "Max In Use" field stores the maximum number of compute processors simultaneously in use by Launchers running inside of the partition. The 'Batch Job Error' flag is set when a batch job encounters an error with one or more compute processors in the partition. This flag is also set when a Launcher running inside of the partition that is part of a batch job exits abnormally.

| Launcher ID | Launcher Cookie | Partition ID | Login Processor | Process ID | Command | Creation Time |
|---|---|---|---|---|---|---|
| unsigned 64-bit | 64-bits | unsigned 64-bit | Integer | unsigned | String | date and time |

The Launcher Table contains one entry (example entry shown above) for each Launcher running in the system. The 'Launcher ID' field stores the ID that the CPA assigned to the Launcher. This ID is guaranteed to be unique within one single boot-shutdown cycle of a compute system. The 'Launcher Cookie' field stores a pseudorandom number that CPA clients must match in order to manipulate the Launcher entry. The 'Launcher Cookie' field is only accessible by the CPA daemon. The 'Partition ID' field stores the ID of the partition that the Launcher is running within. The 'Login Processor' field stores the ID of the login processor that the Launcher is executing on. The 'Process ID' field stores the UNIX process ID of the Launcher. The 'Command' field contains the Launcher command line string. The Launcher command line string is communicated by the Launcher to the CPA when it allocates processors from a partition. The 'Creation Time' field stores the date and time that the Launcher entry was created.

In some embodiments, each launcher registers with the RCA 136, then cooperates with a CPA to obtain a compute processor allocation, and then launches its application. The RCA, provided on every login processor in some embodiments, monitors a periodic heartbeat signal provided by the launcher. When the launcher's application has completed and the launcher exits, it unregisters with the RCA. If the launcher heartbeat signal ends before the launcher unregisters with the RCA, then the RCA reports this occurrence to the CPA. This indicates that the launcher has exited improperly in some manner. The CPA responds to this indication by invoking an executable on its login node, which executable "cleans up" the compute processors by interrupting and closing any still-running applications that had been launched by the launcher that exited improperly. The operation of the "clean up" executable is designated generally at 137 in FIG. 13.

Figure 14:
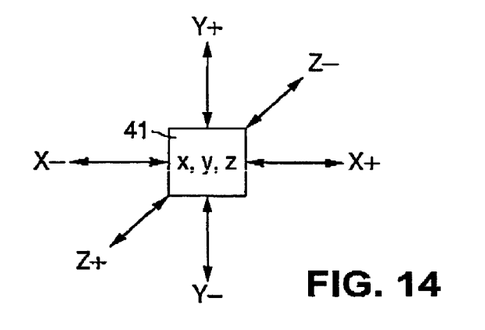
FIG. 14 diagrammatically illustrates a router according to exemplary embodiments of the invention.

As can be seen from the foregoing description, each of the routers 41 is capable of supporting six bi-directional hops between itself and six other routers, one router for each direction in each dimension of the logical three-dimensional network mesh. This can be seen from FIGS. 6 and 7 above, and is also illustrated generally in FIG. 14.

Figure 15:
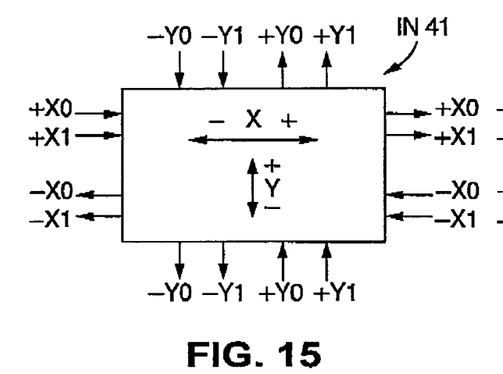
FIGS. 15 and 16 diagrammatically illustrate respective portions of a router according to exemplary embodiments of the invention.
Figure 16:
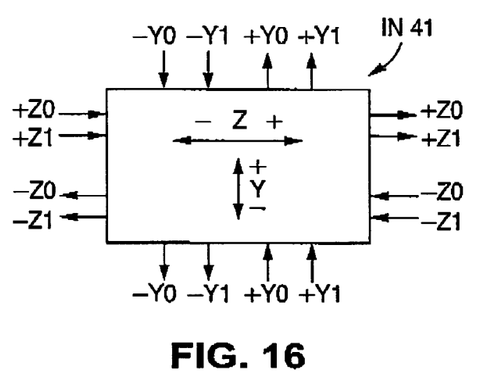

FIGS. 15 and 16 diagrammatically illustrate the xy plane portion and the yz plane portion, respectively, of a router 41 according to exemplary embodiments of the invention. Note from FIGS. 15 and 16 that, for each dimension of the associated plane, two pairs of inputs and two pairs of outputs are provided. For example, in the y direction of the xy plane portion of FIG. 15, the input pair −y0 and −y1 provide y inputs for receiving communication flowing in the −y direction. Similarly, the input pair +y0 and +y1 provide inputs for receiving communications traveling in the +y direction. Similarly, the output pair −y0 and −y1 provide outputs for sending communications out in the −y direction, and the output pair +y0 and +y1 provide outputs for sending out communications in the +y direction. The remaining inputs and outputs in FIGS. 15 and 16 are identified using the same type of nomenclature described above, and the arrowheads clearly indicate inputs and outputs.

The two pairs of inputs and outputs in each direction represent two logical channels referred to herein as channel 0 and channel 1. Thus, for each of the three dimensions, each router supports channel 0 and channel 1 operations in both directions for that dimension. Taking the y dimension of FIGS. 15 and 16 as an example, −y0 designates channel 0 extending through the router in the −y direction, +y0 designates channel 0 extending through the router in the +y direction, −y1 designates channel 1 extending through the router in the −y direction, and +y1 designates channel 1 extending through the router in the +y direction. Channels 0 and 1 extending in each of the x and z dimensions can also be seen from FIGS. 15 and 16.

Although the xz plane portion of the router 41 has not been illustrated, it can be readily seen that the xz portion is arranged in generally analogous fashion to the xy and yz portions of FIGS. 15 and 16.

Figure 17:
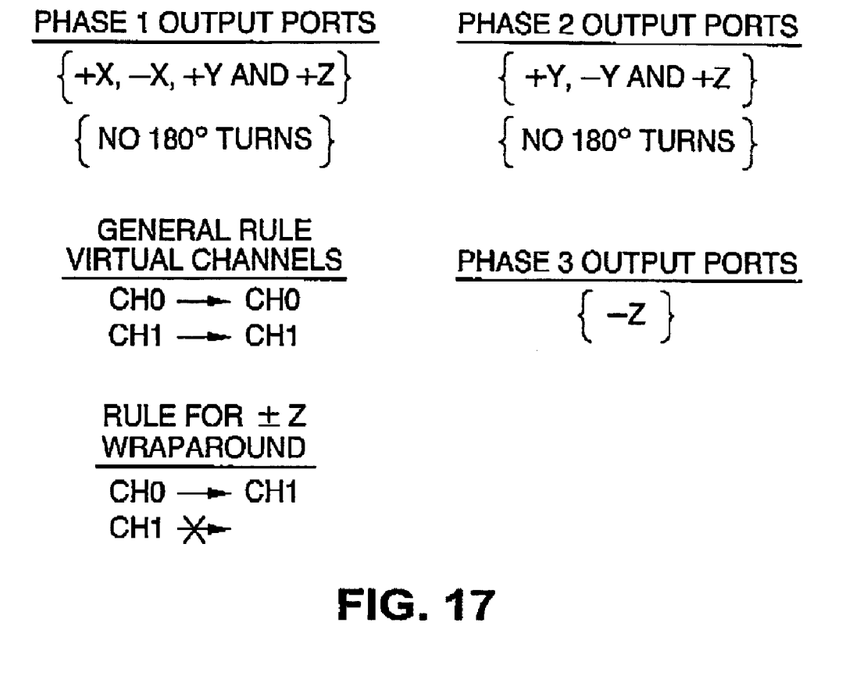
FIG. 17 illustrates routing table rules according to exemplary embodiments of the invention.

It should be evident that, for any given direction in any given dimension, channel 0 and channel 1 need not be implemented as physically separate channels, but can be implemented as logical or virtual channels by simply including within each discrete communication block (e.g., packet) information which indicates whether that block is traveling on channel 0 or channel 1. Packets in channel 0 are not permitted to block packets in channel 1, and vice versa FIG. 17 illustrates pertinent portions of a routing table utilized by the routers 41 according to exemplary embodiments of the invention. The routing table of FIG. 17 specifies rules for selecting output ports in three different phases of routing, designated phase 1, phase 2 and phase 3. The routing table also provides rules that apply to the virtual channels generally, and rules that apply when a communication traveling in the z direction on any given one of the aforementioned z direction torus configurations (see also FIG. 7) crosses a wraparound boundary. In the example of FIG. 17, all routing in the x dimension, both positive and negative, must be accomplished in phase 1. Routing in the +y and +z directions can also be performed in phase 1, and no 180 degree turns are permitted in phase 1. In phase 2, routing in the +y and −y directions is permitted, together with routing in the +z direction. Any y dimension routing that was not performed in phase 1 must be performed in phase 2, and no 180 degree turns are permitted in phase 2. Phase 3 permits only routing in the −z direction. The rules of these three routing phases represent a prior art approach to fault-tolerant, deadlock-free routing, absent wraparound connections.

Studying the exemplary rules of FIG. 17 in more detail, it can be seen that, for the xy plane, all routing in the x dimension must be finished before any routing in the −y direction can be performed. For the yz plane, all routing in the y dimension must be completed before any routing in the −z direction can be performed.

The table of FIG. 17 indicates the general rule for virtual channels, namely that a communication which arrives at the router on channel 0 must in general be output from that router as a channel 0 communication, and a communication that arrives on channel 1 must in general be output on channel 1.

The table of FIG. 17 also includes special rules for utilizing channel 0 and channel 1 in the z dimension in wraparound situations. As mentioned above, the general rule for handling channel 0 and channel 1 in all dimensions is that, if the incoming communication is designated as channel 0, when the router outputs that communication it will also be designated as channel 0, and input communications designating channel 1 are output as communications which also designate channel 1. Although all three dimensions utilize the channel 0/channel 1 organization, this two channel organization is particularly important in the z dimension, because at any given xy coordinate, the z dimension router connections are configured as a torus which wraps around from the KBth plane back to the first plane in FIG. 7. It is therefore necessary to avoid the possibility of communication deadlock in such a wrap around configuration.

So, for example, all 4 RC routers in the KBth plane of FIG. 7 can route traffic traveling in the z dimension according to the z wraparound rule of FIG. 17. When traffic passes through any of these routers in the z dimension, it is crossing a wraparound boundary of the z dimension torus, and must therefore be handled according to the z dimension wraparound rule of FIG. 17. More specifically, if a communication traveling in the z dimension arrives at the router on channel 0, the router must output that communication in the z dimension as a channel 1 communication. This applies to traffic crossing through this z dimensional wraparound boundary in either direction of the z dimension. Moreover, if any of these wraparound routers receives an input communication traveling in the z direction and designated as channel 1, the router is forbidden from outputting that communication in the z dimension. By handling channels 1 and 0 in this fashion for traffic traveling in the z dimension through any of the 4 RC routers in the designated wraparound plane, deadlock in the torus configuration can be avoided. The z dimension boundary routers of the KBth plane handle channels 0 and 1 in the x and y dimensions according to the general rule of FIG. 17. Finally, for all routers in the network, all routes begin on channel 0.

The routing conventions as described above and illustrated in FIG. 17 advantageously provide fault-tolerant, deadlock-free routing in the three dimensional network mesh of FIGS. 7 and 8. The prior art approach also uses the z dimension wraparound rule of FIG. 17, but does not impose the general virtual channel rule of FIG. 17, so no router is subject to any rules regarding the use of the virtual channels in the x and y dimensions. But it can be shown that this lack of attention to virtual channels in the x and y dimensions can result in deadlock.

The dimensions x, y and z can be interchanged in the structure of the rules of FIG. 17, depending on the network topology, without affecting the routing methodology. Also, the directional choices in FIG. 17 can be changed without affecting the routing methodology. For example, phase 1 could instead permit outputs in the −y direction and +z direction, or in the −y direction and the −z direction, or in the +y direction and the −z direction, so long as the z dimension output direction permitted in phase 2 is the same as the z dimension output direction permitted in phase 1 and the z dimension output direction permitted in phase 3 is the opposite of the z dimension output direction permitted in phases 1 and 2. So, phases 1 and 2 could permit outputs in the −z direction, while phase 3 would permit outputs in the +z direction. Generally, all routing in one of the three dimensions is confined to phase 1 with routing in one direction of each of the other two dimensions also permitted in phase 1, with phase 2 accounting for all remaining routing in one of the remaining two dimensions while also permitting routing in the same direction of the third dimension as in phase 1, and with phase 3 only permitting routing in the third dimension, and in the opposite direction that was permitted for the third dimension in phases 1 and 2.

Referring again to FIG. 13, hereinbelow are described exemplary processor allocation techniques that can be implemented by the physical processor allocation algorithm 135 according to exemplary embodiments of the invention.

Figure 18:
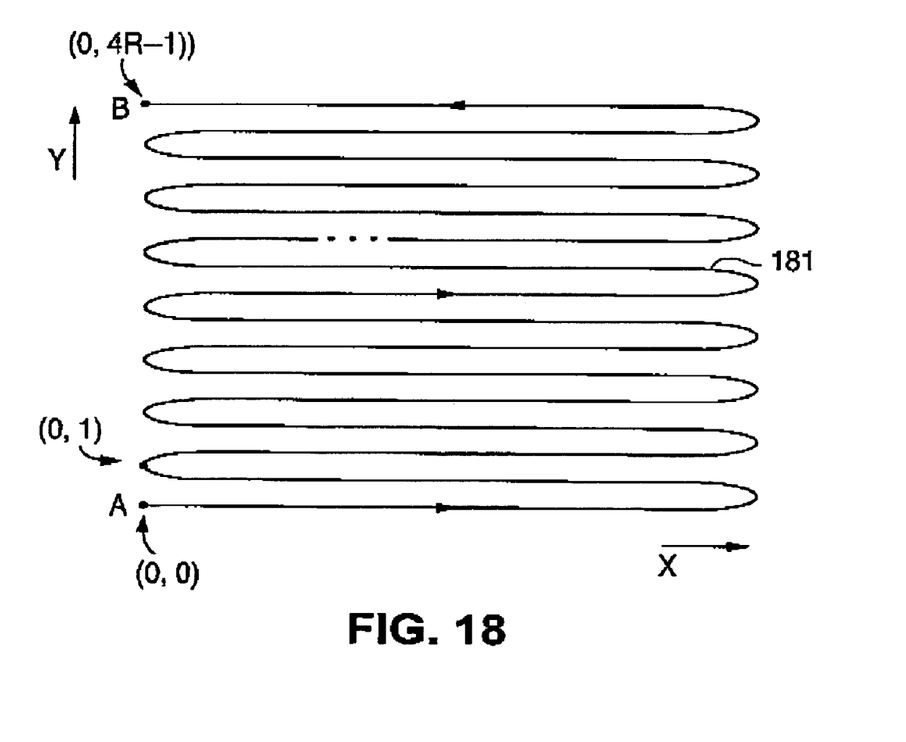
FIGS. 18, 18A and 19 illustrate linear ordering of processors to support processor allocation according to exemplary embodiments of the invention.

FIG. 18 diagrammatically illustrates a method of ordering and identifying the compute processors of the computing apparatus (described above with respect to FIGS. 1-8) for purposes of determining how to allocate available processors. FIG. 18 illustrates specifically how the compute processors of any given xy plane are ordered according to exemplary embodiments of the invention. Beginning at point A, which corresponds to x=0, y=0 of the compute processor portion of the xy plane, a number line can be constructed such that each compute processor in that particular xy plane is numbered consecutively in the order that the logical position of the processor within the network mesh is intersected by the space-filling curve of FIG. 18. As shown in FIG. 18, the curve begins at point A and proceeds in the positive x direction until the x dimension is exhausted, then changes by 1 in the +y direction and returns back in the −x direction until the point x=0, y=1 is reached. This generally serpentine path continues repetitively across the x dimension positively, then incrementing by 1 in the y dimension and back across the x dimension negatively, ultimately terminating at point B, whose coordinates are x=0, y=4R−1. This serpentine curve thus passes through all 4R(C−4) compute processors in the xy plane. In some embodiments, the numbering can begin at point A, with each individual processor being numbered consecutively as its logical position in the network mesh is intersected by the serpentine curve of FIG. 18.

The shape of the curve in FIG. 18 is based on the routing table rules of FIG. 17. Because the rules of FIG. 17 basically require that the routes between compute processors must finish moving in the x dimension before finishing their movement in y dimension, and must finish moving in the y dimension before finishing their movement in the z dimension, the curve of FIG. 18 spans the x dimension before incrementing in the y dimension, and also accounts for the entire xy plane before moving in the z dimension (described below).

The serpentine curve of FIG. 18 corresponds to tracking across the xy planar grid of FIG. 6 from left to right in the x direction, then incrementing by 1 in the y direction, then back from right to left in the x direction, then incrementing by 1 in the y direction, and then repeating the pattern until all compute processors in the xy planar grid have been intersected by the serpentine pattern. The resulting number line is numbered consecutively from the first compute processor at the lower left of the xy planar grid, designated as A, to the final compute processor at the upper left of the xy planar grid, designated as B. Because 4R is an even number, the compute processor associated with B will have the same x coordinate as the compute processor associated with A, for example, x=0 in FIG. 18. An entire number line (or linear ordering) is constructed by connecting the serpentine portion of the number line in each plane to the serpentine portion of the number line in the adjacent plane in the z direction. For the xy plane where z=0, the coordinates on the number line increase consecutively from point A to point B, as illustrated by arrows in FIG. 18. From point B in the z=0 plane, the next coordinate on the number line is point B in the z=1 plane. The coordinates on the number line continue to increase consecutively in this z=1 plane from point B back to point A, but in a direction opposite the arrowheads of FIG. 18, as shown by arrows in FIG. 18A. The next point on the number line after point A in the z=1 plane would be point A in the z=2 plane. The number line portion in the z=2 plane would then look the same as the number line portion for the z=0 plane, that is, the same as in FIG. 18. The next point in the number line after point B in the z=2 plane would be point B in the z=3 plane. The number line portion in the z=3 plane will look the same as the number line portion in the z=1 plane, that is, the same as in FIG. 18A.

Figure 18A:
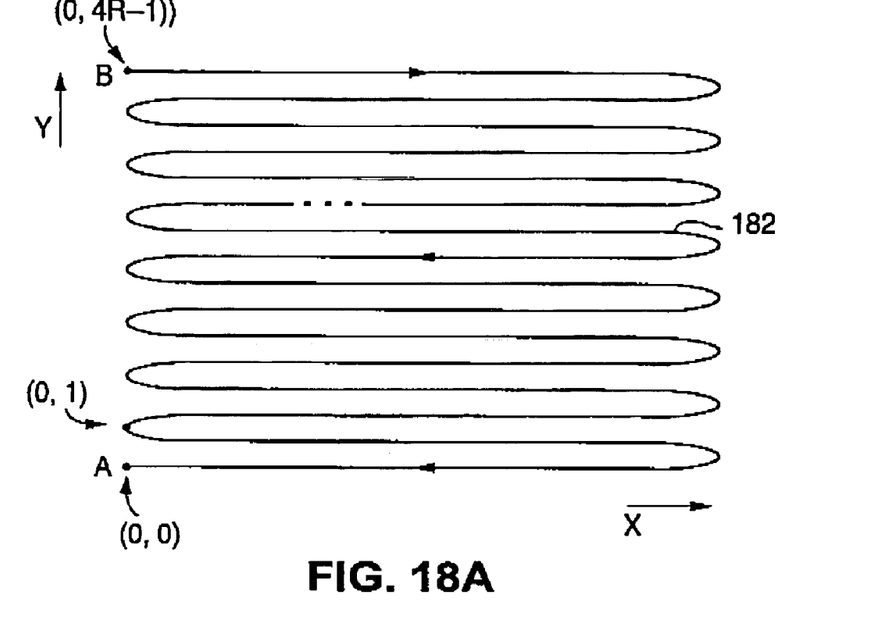

To summarize, in the xy planes where z=0 or z is an even number, the number line portion 181 of FIG. 18 applies, with the coordinates of the number line increasing consecutively from point A to point B. For x y planes where z is odd, the number line portion 182 of FIG. 18A applies, with the number line coordinates increasing consecutively from point B to point A. For all xy planes where z is an odd integer, N, the coordinate of point B in that plane is the next consecutive coordinate after the coordinate of point B in the xy plane where z=N−1. For all xy planes where z is an even integer, L, the coordinate of point A of that plane is the next consecutive number line coordinate after the coordinate of point A of the xy plane where z=L−1. This is illustrated generally in FIG. 19, where the serpentine portions 181 and 182 of FIGS. 18 and 18A are illustrated by dashed lines, the continuities between those portions of the number line are illustrated by solid line, and KB is even.

Figure 19:
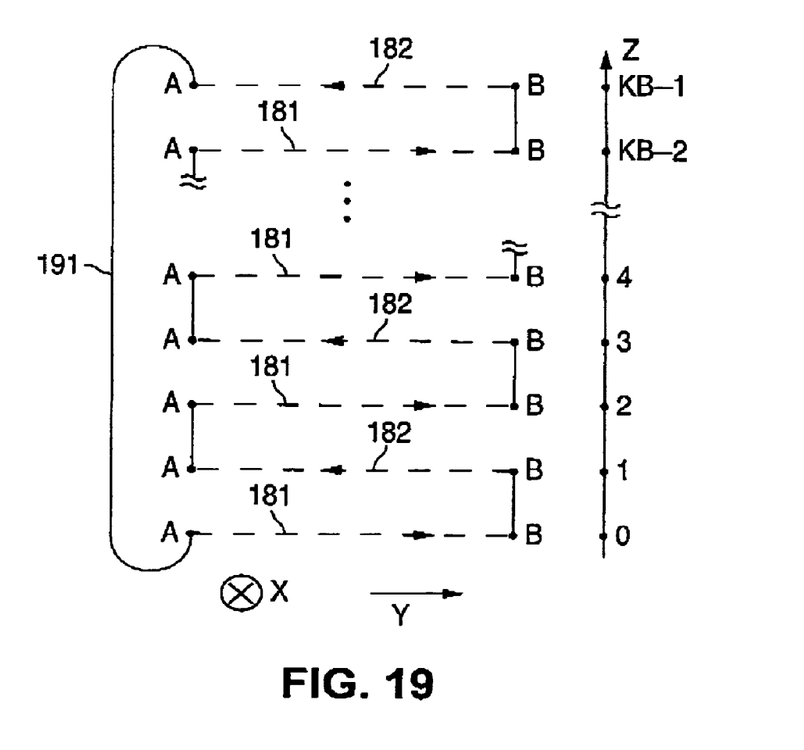

So long as there are an even number of z planes (KB is even) in the three dimensional mesh, the highest coordinate of the number line will reside at point A in the xy plane having the highest z coordinate. All points A in all of the xy planes correspond to one another positionally in the cabinets, and therefore each point A is in fact connected in a torus configuration with every other point A, as described above with respect to FIGS. 6 and 7. Accordingly, point A in the xy plane with highest z coordinate is literally only one hop away from point A in the xy plane where z=0. Due to this connectivity, the number line formed by interconnecting the serpentine number line portions of the various xy planes, as shown in FIG. 19, actually assumes a wraparound or ring configuration, illustrated at 191 in FIG. 19.

The application of bin-packing algorithms to number line orderings is known in the art. The intervals of contiguous free processors are analogous to free space in unfilled bins. In the bin-packing approach to allocating processors contiguously, it is first determined if there is a contiguous interval of free processors large enough to run a given job. If the job can be allocated to contiguous processors, the interval can be chosen based on adaptations of one-dimensional bin-packing algorithms. For example, the job can be allocated to the first interval that is large enough (first fit allocation). As another example, the job can be allocated to the interval that minimizes the number of unallocated processors remaining in the interval after the job is allocated to the interval (best fit allocation). As another example, for each interval to which the job could be allocated, the number of intervals of each size that would remain is determined. The job is then allocated to the interval that minimizes the sum of squares of these numbers of intervals (sum-of-squares allocation). For any tie, the job is allocated to the smallest number line value possible.

Figure 20:
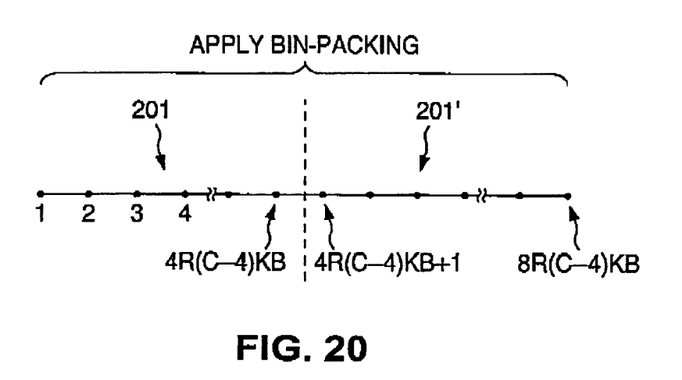
FIG. 20 illustrates the application of bin-packing to a wrap-around processor allocation number line according to exemplary embodiments of the invention.

The aforementioned bin-packing algorithms can be adapted for use with the closed ring number line described above with respect to FIGS. 18 and 19. This can be done by simply taking the original number line 201 defined from point A in the z=0 plane and ending at point A in the z-KB−1 plane, then placing a copy 201' of that number line adjacent the original number line, and numbering its points consecutively beginning with the highest number of the original number line. This is illustrated generally in FIG. 20. The broken line separating the two number lines 201 and 201' in FIG. 20 corresponds to the point of wraparound in the ring structure number line of FIGS. 18 and 19. If application of a conventional bin-packing algorithm results in the allocation of some points on both sides of the broken line in FIG. 20, then that solution will exploit the wraparound feature of the ring number line of FIGS. 18 and 19, and so will include the processors associated with coordinates 1 and 4R(C-4)KB.

Some exemplary embodiments apply the conventional MC allocation algorithm to the three dimensional grid of FIGS. 6 and 7. For each free processor, the quality of a job allocation centered on that processor is evaluated. This is done by counting the number of free processors within a three dimensional sub-grid centered on the free processor itself, and also by counting the number of free processors within one or more three dimensional sub-grid "shells" of processors surrounding the three dimensional sub-grid. The processors are then weighted according to the shell where they are encountered. In some embodiments, the weight for the central free processor is 0, the weight for the processors of the closest surrounding shell is 1, the weight for the processors of the next most closest surrounding shell is 2, and so on. Free processors are selected from the inside shell(s) before the outside shell(s), until enough are found for the allocation. The sum of the weights of the selected free processors gives the cost of the allocation, and the algorithm chooses the allocation with the lowest cost. As one example, a 3×3×3 shell surrounds a free processor, and is also surrounded by a 5×5×5 shell, with both shells centered on the free processor.

Figure 21:
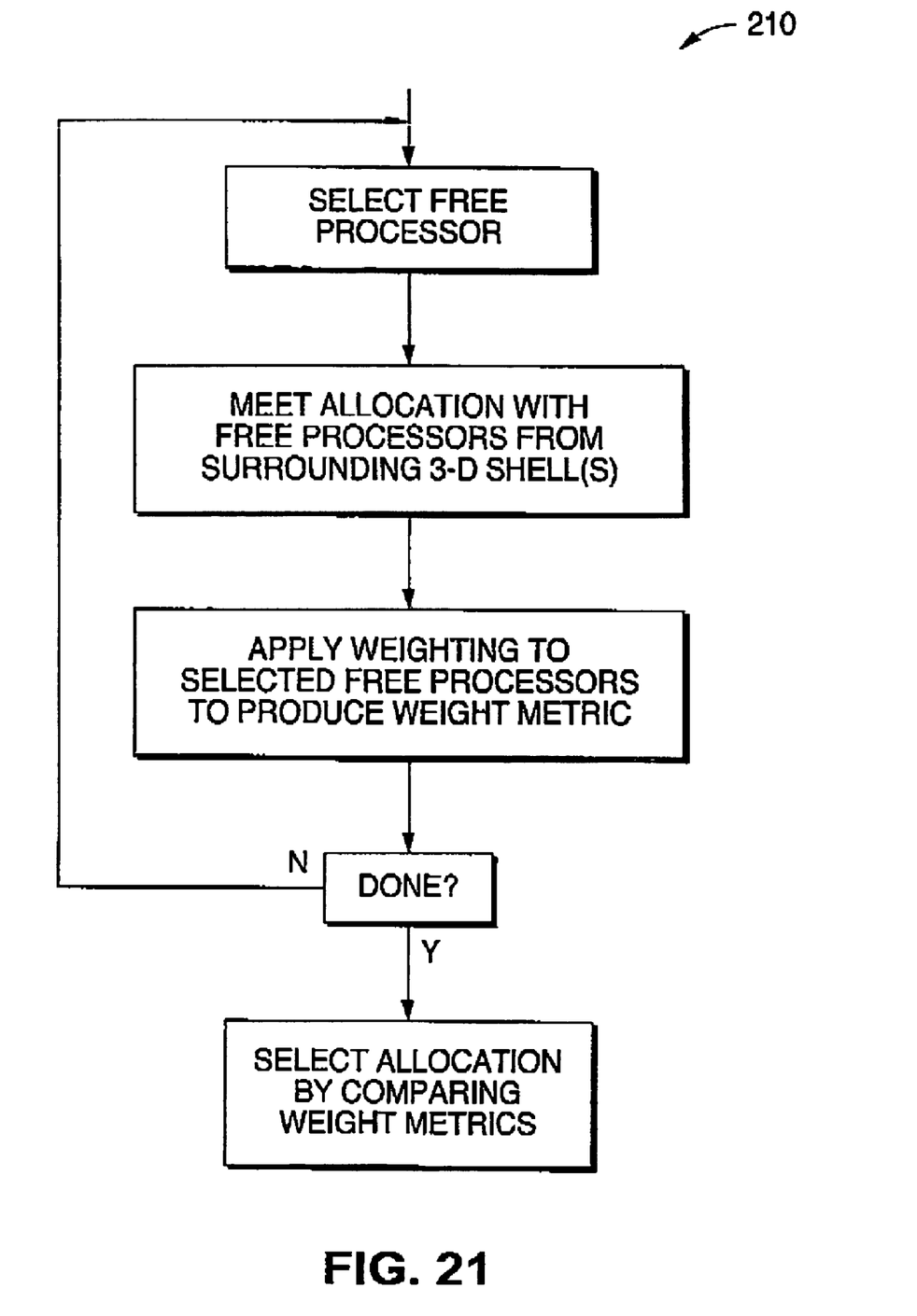
FIG. 21 illustrates an MC processor allocation algorithm for operation in three dimensions.

As an example, if 100 processors are required for an allocation and, given a first free processor, if 30 free processors are identified in the surrounding 3×3×3 shell, and the remaining 69 free processors are identified in the surrounding 5×5×5 shell, this would yield a resultant weight of (1×30)+(2×69) =168, where the processor weights are 1 and 2 for the 3×3×3 and 5×5×5 shells, respectively. If, for a second free processor, 25 processors are free in its surrounding 3×3×3 shell, and the remaining 74 processors come from its surrounding 5×5×5 shell, this yields a resultant weight of (1×25)+(2×74)=173. The first free processor and the free processors from its associated surrounding shells will therefore be allocated because their resultant weight of 168 is smaller. The 3-dimensional MC allocation process is illustrated generally at 210 in FIG. 21.

Although exemplary embodiments of the invention have been described above in detail, this does not limit the scope of the invention, which can be practiced in a variety of embodiments.

What is claimed is:

1. A computing apparatus, comprising:
 a plurality of processors;
 a communication network structure including a plurality of routers that are respectively connected to respectively associated ones of said plurality of processors, each of said routers having associated therewith a plurality of communication paths that connect said router to others of said routers, said processors interconnected for communication with one another by said routers and said communication paths, each of said routers configured to implement a same set of routing rules to determine which of the associated communication paths will be used to forward a communication that is received by said router while enroute between a communicating pair of said processors; and a processor allocator coupled to said communication network structure and configured to select a group of said processors to cooperatively execute an application;

wherein said processor allocator selects said group of processors based on a mapping between said plurality of processors and a plurality of respectively associated identifiers that identify the associated processors and define a sequence;

wherein said processor allocator selects said group of processors by selecting a group of said identifiers whose respectively associated processors have processing capacity available to support execution of said application; and wherein said mapping is based on said routing rules.

2. The apparatus of claim 1, wherein said mapping defines a corresponding relationship between said plurality of routers and respectively associated ones of said identifiers.

3. The apparatus of claim 2, wherein adjacent pairs of said identifiers in said sequence respectively correspond to pairs of said routers that are only one communication hop apart in said communication network structure.

4. The apparatus of claim 3, wherein first and last ones of said identifiers in said sequence correspond to respective ones of said routers that are only one communication hop apart in said communication network structure.

5. The apparatus of claim 2, wherein first and last ones of said identifiers in said sequence correspond to respective ones of said routers that are only one communication hop apart in said communication network structure.

* * * * *